(12) United States Patent
Zhang et al.

(10) Patent No.: US 10,883,470 B2
(45) Date of Patent: Jan. 5, 2021

(54) WAVE POWER GENERATION DEVICE

(71) Applicant: Yi Zhang, Shandong (CN)

(72) Inventors: Yi Zhang, Jinan (CN); Huijie Zhang, Beijing (CN); Jilin Zhang, Beijing (CN)

(73) Assignee: Yi Zhang, Jinan (CN)

( * ) Notice: Subject to any disclaimer, the term of this patent is extended or adjusted under 35 U.S.C. 154(b) by 0 days.

(21) Appl. No.: 16/630,626

(22) PCT Filed: Jul. 18, 2018

(86) PCT No.: PCT/CN2018/096181
§ 371 (c)(1),
(2) Date: Jan. 13, 2020

(87) PCT Pub. No.: WO2019/015619
PCT Pub. Date: Jan. 24, 2019

(65) Prior Publication Data
US 2020/0149506 A1    May 14, 2020

(30) Foreign Application Priority Data
Jul. 20, 2017   (CN) .......................... 2017 1 0616759

(51) Int. Cl.
*F03B 13/16*     (2006.01)
*F03B 13/22*     (2006.01)
(Continued)

(52) U.S. Cl.
CPC ............ *F03B 13/16* (2013.01); *F03B 13/187* (2013.01); *F03B 13/1875* (2013.01);
(Continued)

(58) Field of Classification Search
CPC .................................. F03B 13/16; F03B 13/22
See application file for complete search history.

(56) References Cited

U.S. PATENT DOCUMENTS 974,869 A * 11/1910 Farmer ................. F03B 13/142
60/501
1,471,222 A * 10/1923 Taylor ................... F03B 13/186
60/496
(Continued)

FOREIGN PATENT DOCUMENTS

| CN | 101603497 A | 12/2009 |
| CN | 106401850 A | 2/2017 |
| CN | 107178463 A | 9/2017 |

OTHER PUBLICATIONS

International Search Report dated Sep. 17, 2018 for PCT/CN2018/096181.
Written Opinion dated Sep. 17, 2018 for PCT/CN2018/096181.

*Primary Examiner* — Michael Leslie
(74) *Attorney, Agent, or Firm* — Enshan Hong; VLP Law Group LLP

(57) ABSTRACT

A wave power generation device comprises a floating energy harvester (1), a plurality of energy conversion levers (2) and a plurality of energy transferring rods (3) suspended around the floating energy harvester (1); one end of the energy transferring rod (3) is connected to the floating energy harvester (1), and the other end is sleeved onto the lower end of the energy conversion lever (2); the energy transferring rod (3) transfers energy harvested from a horizontal movement of a wave by the floating energy harvester to the energy conversion lever (2), and follows the vertical motion of the energy conversion lever (2) as the surface of the sea rises and falls; an upper end of the energy conversion lever (2) is connected to a first working mechanism (102), and a lower end of the energy conversion lever (2) is submerged in seawater.

8 Claims, 4 Drawing Sheets

(51) Int. Cl.
*F03B 13/18* (2006.01)
*F03B 13/26* (2006.01)
(52) U.S. Cl.
CPC ............ *F03B 13/22* (2013.01); *F03B 13/262* (2013.01); *Y02E 10/30* (2013.01)

(56) References Cited

U.S. PATENT DOCUMENTS

| | | | |
|---|---|---|---|
| 7,908,854 B2* | 3/2011 | Raikamo | F03B 13/186 60/498 |
| 8,522,544 B2* | 9/2013 | Zhang | F03B 13/1815 60/497 |
| 8,937,396 B2* | 1/2015 | Findlay | F03B 13/20 290/53 |
| 9,309,860 B2* | 4/2016 | Hon | F03B 13/1815 |

* cited by examiner

WAVE POWER GENERATION DEVICE

RELATED APPLICATIONS

This is a U.S. national stage of international application No. PCT/CN2018/096181 filed on Jul. 18, 2018, which claims priority from China Patent Application No. 201710616759.6 filed on Jul. 20, 2017, the entire content of which is incorporated herein as reference.

TECHNICAL FIELD

The present invention relates to the technical field of energy conversion, in particular to a wave power generation device which collects wave energy to generate electricity by using marine floating objects.

BACKGROUND OF THE INVENTION

The ocean accounts for more than 70% of the earth's area. The ups and downs, horizontal movement, shaking and rotation of seawater not only have huge amounts of energy, but also have certain laws. They are inexhaustible natural carbon-free clean energy sources. The density of seawater is more than 850 times larger than the density of air, and the prospect of wave power generation is much greater than that of wind power generation. Hundreds of ideas have been proposed for the past 100 years on the use of wave power generation, and the more mature ones are tidal power generation. As the tide fluctuates up to twice a day, the available time and tidal range are limited, and its geographical environment requires high equipment loss, so it is difficult to commercialize and popularize it.

After studying, observing and studying, the inventors of the present application find that the waves have a "law of flowing to the shore", that is, the nature of the energy transmitted by the waves reaching the shore has changed, and the water quality in the ocean has changed into the water quality reciprocating flow of points perpendicular to the coast, forms a tide current. Tidal currents have horizontally flowing kinetic energy, which provides power for wave power generation. Due to the influence of terrain, climate, wind and deep-sea waves, the wave height in some near-shore areas increases, and some can reach more than a few meters. The ups and downs of this wave have potential and kinetic energy, and it seems that it can be used for power generation. This kind of wave has the "point floating phenomenon" of ups and downs (that is, there is a phenomenon of vertical rise and fall at a small area point, which can collect energy to do work, but on a large area of the sea, there are scattered and disordered multiple points one after another, and the energy cancels out, cannot be collected to do work), so it cannot be used until the constraints of "point-float restriction" is overcome.

The inventors of the present application have disclosed a technical solution for generating electricity by using three-dimensional energy of wave ups and downs and horizontal movements. This technical solution collects ocean wave energy by a floating energy harvesting device composed of a cabin-like energy harvesting floating body and a floating body movement range limiting device, and then transmits the wave energy to an energy conversion device through an energy transfer device. However, due to the failure to solve the "point-float restriction" problem and the implementation of this technical solution, there are problems such as complicated mechanical structure, difficult installation and debugging, and large investment in equipment. Therefore, there is an urgent need for an economic and practical wave power generation device with simple structure and low investment that can overcome the "point-float restriction."

SUMMARY OF THE INVENTION

In order to solve the problems of the existing wave energy power generation devices, such as complicated structure, large investment, difficult installation and constraints of "point-float restriction" and so on, the present invention provides a wave power generation device which uses the energy of three-dimensional orientation of seawater for power generation by using economical and practical common equipment and energy extraction facilities. The wave power generation device comprises a floating energy harvester, a plurality of energy conversion levers and a plurality of energy transferring rods suspended around the said floating energy harvester; one end of the said energy transferring rod is connected to the said floating energy harvester, and the other end is sleeved onto the lower end of the said energy conversion lever; the said energy transferring rod transfers energy harvested from a horizontal movement of a wave by the said floating energy harvester to the said energy conversion lever, and follows the vertical motion of the said energy conversion lever as the surface of the sea rises and falls; an upper end of the said energy conversion lever is connected to a first working mechanism, and a lower end of the said energy conversion lever is submerged in seawater.

A plurality of fixed brackets are fixed around the floating energy harvester; the energy conversion lever is hinged on the fixed bracket through a bearing and can rotate around the bearing.

A baffle is also fixed around the floating energy harvester and able to move up and down.

A plurality of trumpet-shaped surge energy harvesting hoods with large mouth facing down for collecting wave energy up and down are fixed in the floating energy harvester, and an upper end of the surge energy harvesting hood is connected to a second working mechanism.

The floating energy harvester transfers the potential energy of the ocean tidal potential difference to a third working mechanism.

The first working mechanism, the second working mechanism and the third working mechanism respectively include an energy storage mechanism or a kinetic energy machine.

The energy storage method of the energy storage mechanism is a hydraulic energy storage, in particular that a plurality of hydraulic accumulators are connected together to form a hydraulic terminal, the hydraulic terminal controls a hydraulic flow through a hydraulic flow valve to drive a hydraulic motor, and the hydraulic motor drives a generator to generate electricity.

The first working mechanism, the second working mechanism and the third working mechanism respectively drive a generator to generate electricity, or the first working mechanism, the second working mechanism and the third working mechanism are connected with each other to realize a combined drive generator to generate electricity.

The floating energy harvester is a hollow floater made of a strong material resistant to seawater corrosion; the middle part of the floating energy harvester is sagging and the edge part of the floating energy harvester is thin; the floating energy harvester is provided with one or more of residential facilities, storage facilities, entertainment and leisure facilities, sports facilities and energy facilities, and the free part of the harvester can be covered with unpolluted soil for crop planting or animal breeding; the shell of the floating energy harvester submerged in seawater is composed of reefs where marine organism likes to inhabit, and this will not only help parasites such as seaweed, conch, oysters and crabs and so on, but also extend the service life of the floating energy harvester.

The energy conversion lever is made of a rigid and corrosion-resistant material with low elasticity; the energy transfer rod is made of a rod with a specific gravity lower than that of seawater, small elasticity, strong toughness and corrosion resistance; the surge energy harvesting hood is made of a corrosion-resistant hard material.

The wave power generation device provided in the present invention can collect and utilize mechanical energy in three-dimensional directions such as up and down, back and forth, left and right and rotation of the seawater, and has the advantages of a simple and reliable structure, environmental protection of building materials, few intermediate links, easy installation, long service life, high energy conversion rate, high power and low cost. The energy used by the wave power generation device provided in the present invention is non-polluting energy, which can be used not only for power generation, but also as energy for hydrogen production, compressed gas, desalination of seawater, food, and processing of various industrial and agricultural products. The floating energy harvester in the wave power generation device provided in the present invention can realize the development of real estate projects on the sea surface, provide storage, living, sightseeing, entertainment environments, and carry out marine aquaculture, crop planting, livestock and poultry breeding, food processing and other working environments.

DETAILED DESCRIPTION OF PREFERRED EMBODIMNETS

The technical scheme of the present invention is further described below through the accompanying drawings and the preferred embodiment.

Figure 1:
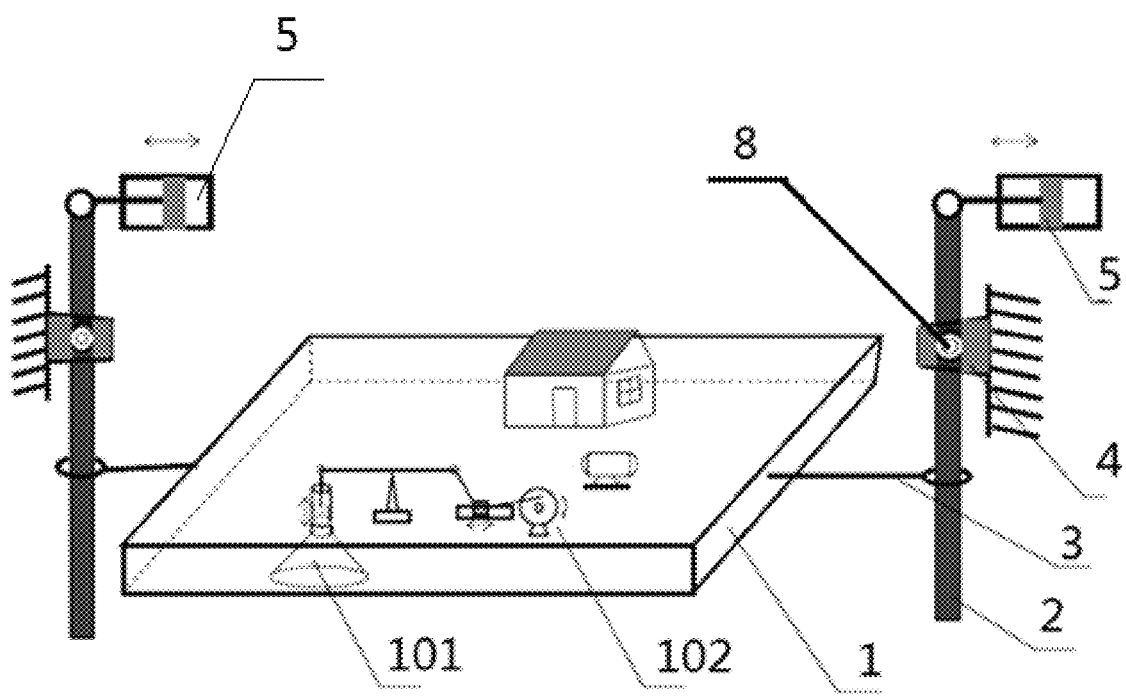
FIG. 1 is a schematic diagram of the overall structure of the wave power generation device provided in the preferred embodiment of the present invention.
Figure 2:
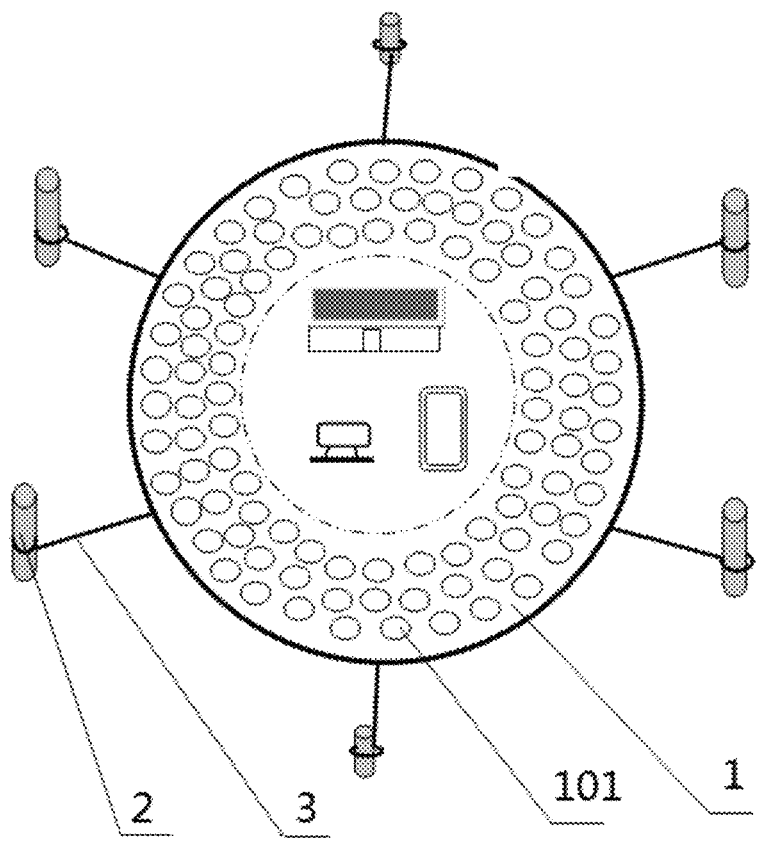
FIG. 2 is a top perspective view of the wave power generation device having a sagging protrusion at the middle portion and the floating energy harvester with a thinner edge portion provided in the preferred embodiment of the present invention.

Referring to FIG. 1 and FIG. 2, the preferred embodiment of the present invention provides a wave power generation device that collects waves up and down and horizontal movement energy to generate electricity by using a floating object on the sea. The wave power generation device comprises a floating energy harvester 1, a plurality of energy conversion levers 2 and a plurality of energy transferring rods 3 suspended around the floating energy harvester 1; wherein a plurality of trumpet-shaped surge energy harvesting hoods 101 with large mouth facing down for collecting wave energy up and down are fixed in the floating energy harvester 1; one end of the energy transferring rod 3 is connected to the floating energy harvester 1, and the other end of the energy transferring rod 3 is sleeved onto the lower end of the energy conversion lever 2; the energy transferring rod 3 transfers energy harvested from a horizontal movement of a wave by the floating energy harvester 1 to the energy conversion lever 2 and follows the vertical motion of the energy conversion lever 2 as the surface of the sea rises and falls; an upper end of the energy conversion lever 2 is connected to a working mechanism 5, and a lower end of the energy conversion lever 2 is submerged in seawater; an upper end of the surge energy harvesting hood 101 is connected to a working mechanism 102.

Referring to FIG. 1 and FIG. 2, a plurality of fixed brackets 4 are fixed around the floating energy harvester 1; the energy conversion lever 2 is hinged on the fixed bracket 4 through a bearing 8 and can rotate around the bearing 8. In practical application, the fixed bracket 4 can be composed of construction materials such as reinforced concrete, steel and so on; the fixed brackets 4 are erected around the floating energy harvester 1 and are located above the sea level; a reef in the sea, an island, a lighthouse or a beach are great options for the erection fixed points of the fixed brackets 4; the energy conversion lever 2 is made of a rigid and corrosion-resistant material with low elasticity, such as stainless steel pipe, alloy material and so on. In practical application, the floating energy harvester can rise and fall naturally with the ebb and flow of the ocean. The floating energy harvester is a hollow floater made of a relatively strong material resistant to seawater corrosion. The more economical and practical preferred solution for making the floating energy harvester is to use the building material integrated block with multiple cavities in the middle part which is composed of fly ash or construction waste crushing and cement combined with steel framework. The building material integrated block is spliced together, and it can set up facilities such as rooms, swimming pools or storage rooms. The outer layer of the integrated block can be glazed structure or polytetrafluoroethylene protection layer to prevent seawater erosion. The shell of the floating energy harvester submerged in seawater is composed of reefs where marine organism likes to inhabit, and this will not only help parasites such as seaweed, conch, oysters and crabs, but also extend the service life of the floating energy harvester. In addition, the free part of the floating energy harvester can be covered with unpolluted soil for crop planting or animal breeding.

In addition, in order to overcome the problem that the draught depth of the floating energy harvester is greater than the wave height of the waves, and the wave energy cannot be obtained from the waves, the floating energy harvester can be made into the shape of thickened bulge in the middle part and thinner edge part, so that the draught depth around the floating energy harvester is less than the wave height of the wave, so as to set up multiple surge energy harvesting hoods, as shown in FIG. 2; at the same time, the middle part of the floating energy harvester is drooped and thickened to increase the buoyancy, and one or more of the residential facilities, storage facilities, entertainment and leisure facilities, sports facilities and energy facilities are arranged on it, such as power stations, houses, restaurants, sightseeing and entertainment venues, swimming pools and other buildings, in order to carry out marine tourism projects and a real estate.

Figure 3:
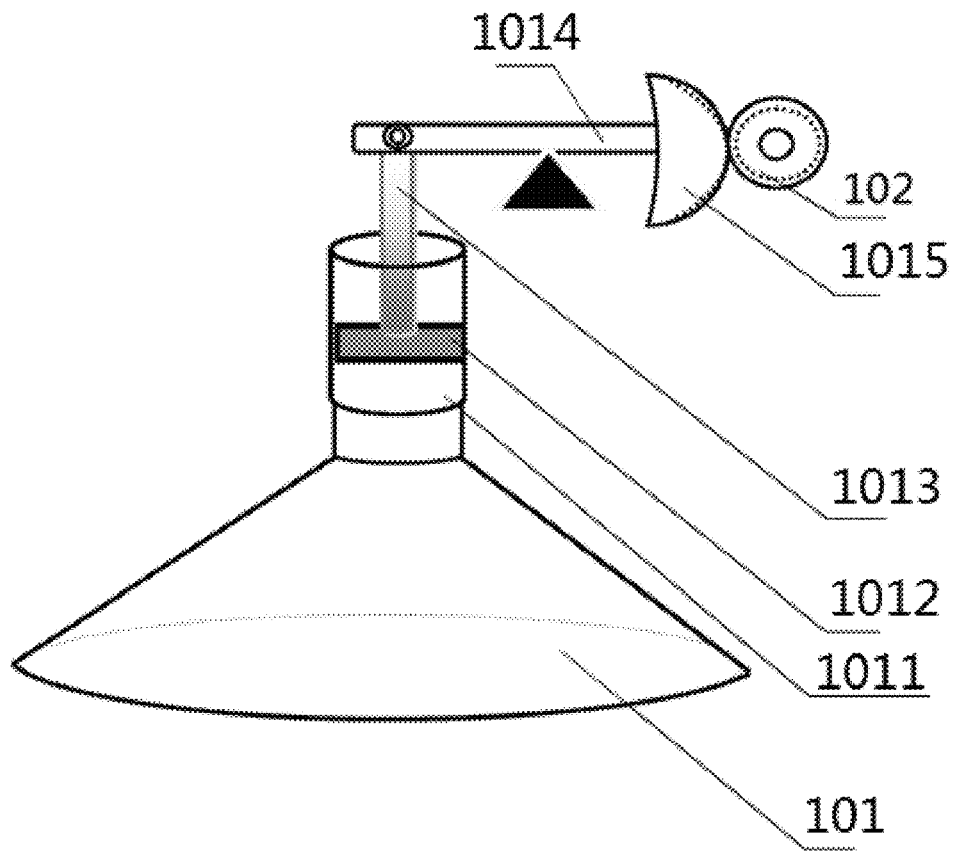
FIG. 3 is a schematic structural diagram of the surge energy harvesting hood in the floating energy harvester in the preferred embodiment of the present invention.
Figure 7:
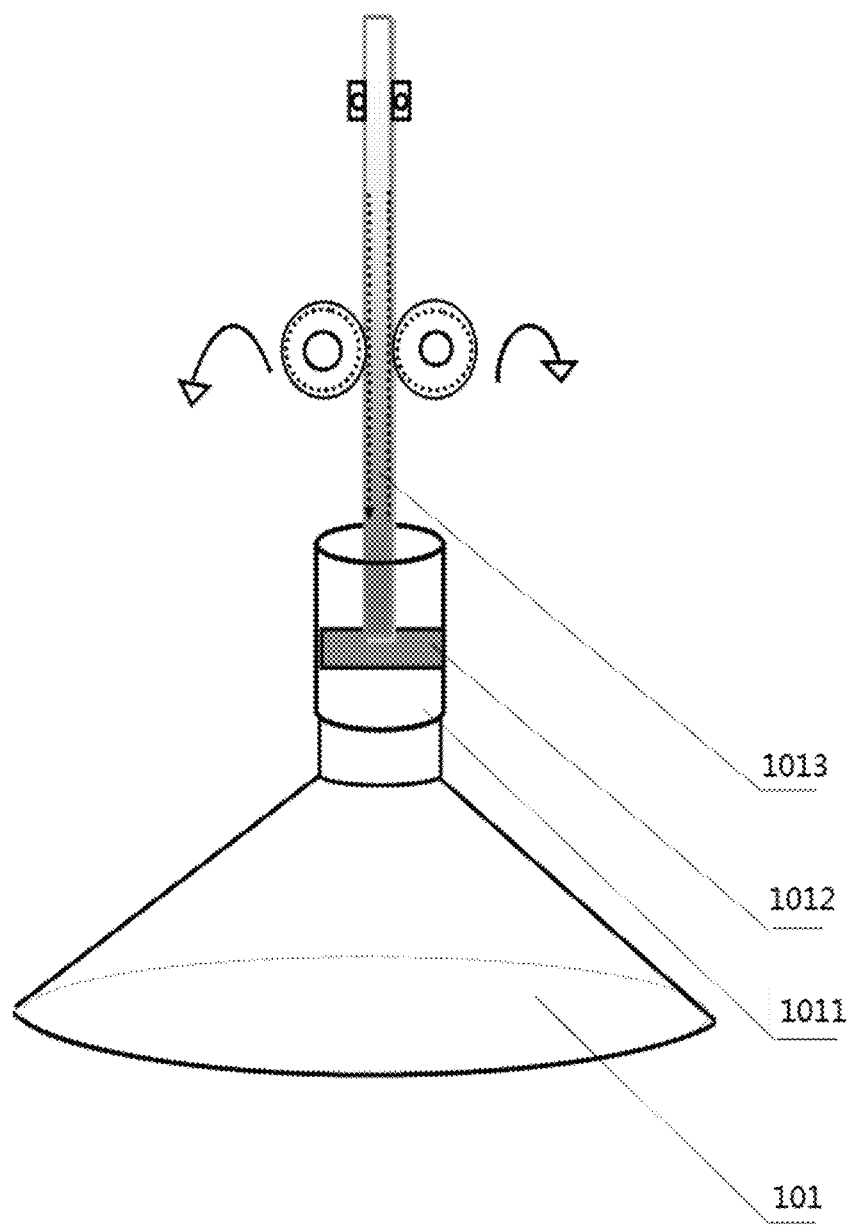
FIG. 7 is another schematic structural diagram of the surge energy harvesting hood on the floating energy harvester in the preferred embodiment of the present invention.

Referring to FIG. 1 to FIG. 3, the upper end of the surge energy harvesting hood 101 is connected to a hydraulic cylinder 1011 for transmitting wave energy. A piston 1012 in the hydraulic cylinder 1011 transmits the wave energy up and down to the working mechanism 102 through a piston rod 1013 and a lever 1014 with a sector gear 1015. In addition, racks and gears can also be fixed on both sides of the piston rod 1013, and the energy can be transmitted to the working mechanism through the cooperation of the racks and gears, as shown in FIG. 7. In practical applications, the surge energy harvesting hood 101 can be made of toughened glass or hard materials such as corrosion-resistant metals, ceramics or plastic etc.; the surge energy harvesting hood 101 is embedded between light-weight reinforced cement integrated blocks to form a whole. In practical applications, the working mechanism 5 and the working mechanism 102 respectively include an energy storage mechanism or a kinetic energy machine; the energy storage method of the energy storage mechanism is a hydraulic energy storage, in particular that a plurality of hydraulic accumulators are connected together to form a hydraulic terminal, the hydraulic terminal controls a hydraulic flow through a hydraulic flow valve to drive a hydraulic motor, and the hydraulic motor drives a generator to generate electricity; the kinetic energy machine includes gears, crankshaft connecting rods and/or hydraulic cylinders etc. In order to achieve cooperation with the sector gear 1015, the working mechanism 102 in this embodiment is a gear. The working mechanism 5 and the working mechanism 102 can drive a generator to generate electricity independently, or the working mechanism 5 is connected to the working mechanism 102 through a hydraulic pipeline to realize a combined drive generator to generate electricity.

Referring to FIG. 1 and FIG. 2, the energy transferring rod 3 is made of a rod with a specific gravity lower than that of seawater, small elasticity, strong toughness and corrosion resistance, such as flat tubular hollow rods made of stainless steel or alloy materials; a plurality of energy transferring rods 3 are fixed around the floating energy harvester 1, one end of which is connected to the side of the floating energy harvester 1, and the other end is annular and sleeved at the lower end of the corresponding energy conversion lever 2; the energy transferring rod 3 floats in the sea water and rise and fall automatically following the fluctuation of the sea level; when the energy of sea level horizontal movement acts on the floating energy harvester 1, the movement of the floating energy harvester 1 will cause the energy transferring rod 3 to move, thereby transferring the horizontal wave energy to the energy conversion lever 2. It should be noted that the connection mode between the energy transferring rod 3 and the energy conversion lever 2 can not only transfer the energy collected by the floating energy harvester 1 to the working mechanism 5, but also make the floating energy harvester 1 relatively fix in a local area, so as to limit the sloshing amplitude of the floating energy harvester 1 and avoid large drifting.

Figure 4:
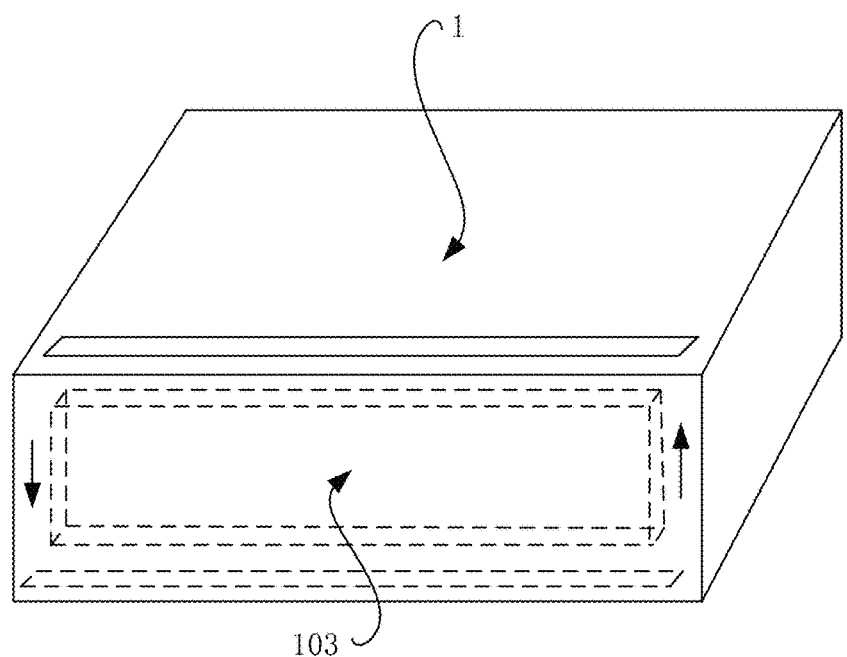
FIG. 4 is a schematic structural diagram of the up-down movable baffle fixed on the floating energy harvester in the preferred embodiment of the present invention.

Referring to FIG. 4, in order to achieve the relative stability of wave power generation and adapt to changes in seawater energy, and to cope with natural disasters such as typhoons, a baffle 103 is also fixed around the floating energy harvester 1 provided in the embodiment of the present invention and able to move up and down. The baffle can be composed of multiple layers of plates that can be controlled to move up and down. The up and down movement of the baffle 103 may be an electric device similar to a lift door or a mechanical device for lifting a curtain. When the energy of the ocean wave is small, the baffle can be moved downward to increase the force area of the seawater and the baffle, thereby increasing the energy obtained by the floating energy harvester 1. When the energy of the ocean wave is large, the baffle can be moved upward to decrease the force area of the seawater and the baffle, thereby reducing the load of the floating energy harvester 1, and increasing the resistance of the baffle to the impact of the waves. When the energy of the ocean wave is too large, the baffle can be moved upward and exceeds the highest plane of the floating energy harvester 1 to prevent seawater from pouring into the floating energy harvester 1.

Figure 5:
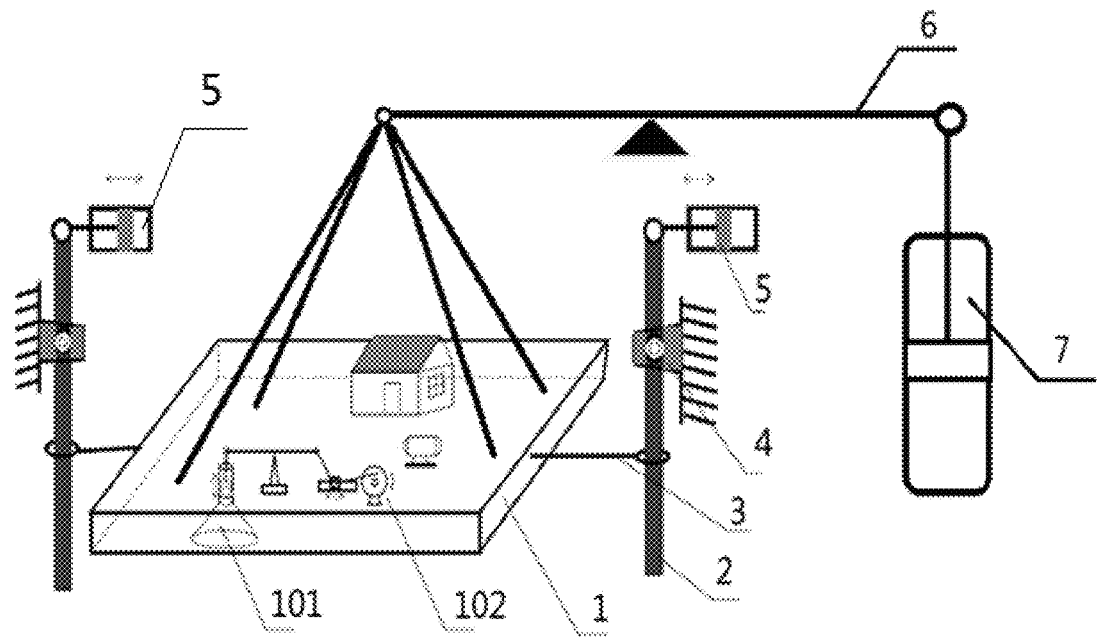
FIG. 5 is a schematic diagram of the overall structure of the tidal power generation device in the preferred embodiment of the present invention.
Figure 6:
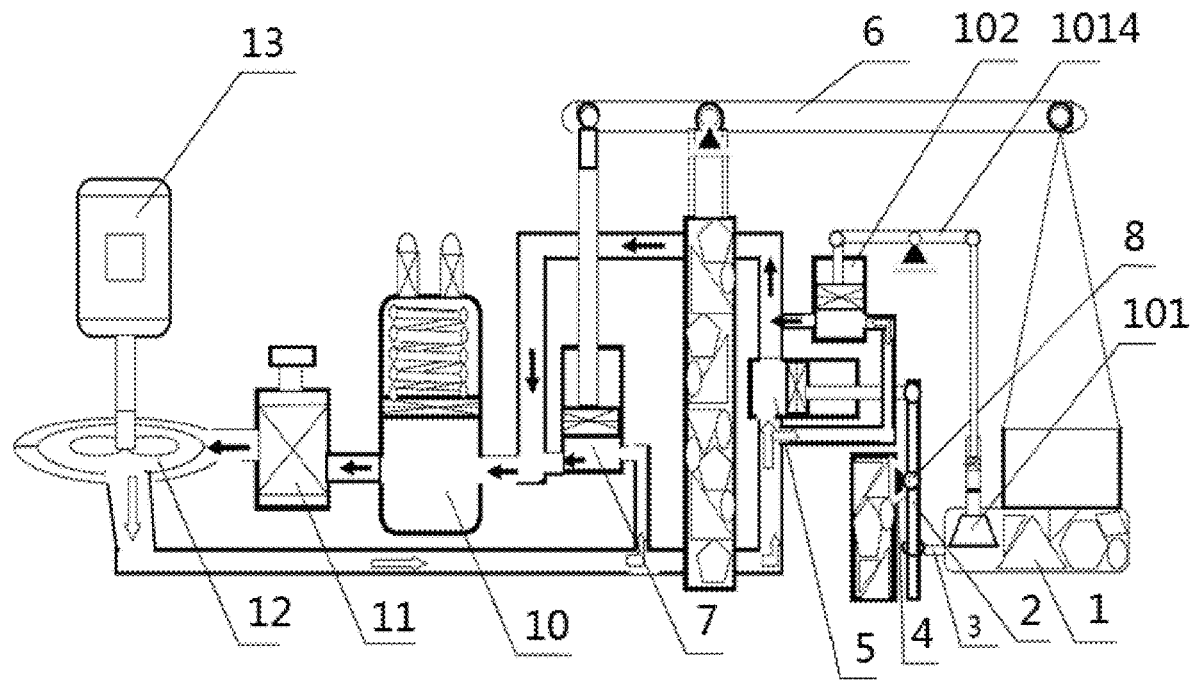
FIG. 6 is a schematic diagram of the working principle of generating electricity utilizing the wave power generation device in the preferred embodiment of the present invention.

In order to make use of the potential energy of the tidal potential difference formed by the ocean tide, the floating energy harvester 1 provided in the embodiment of the present invention can also transfer the potential energy of the ocean tidal potential to a working mechanism 7 through a lever 6 for utilization, as shown in FIG. 5. The working mechanism 7 may also include an energy storage mechanism or a kinetic energy machine. The working mechanism 7 can independently drive the generator to generate electricity, or the working mechanism 7 is connected to the working mechanism 5 and the working mechanism 102 through a hydraulic pipeline to realize a combined drive generator to generate electricity.

Referring to FIG. 1 to FIG. 6, the working principle of power generation by using the wave power generation device provided in the embodiment of the present invention is as follows:

1) A plurality of surge energy harvesting hoods 101 on the floating energy harvester 1 transfer the energy of the waves up and down through the piston 1012 and the piston rod 1013 in the hydraulic cylinder 1011 and the lever 1014 to the working mechanism 102 (eventually acting on the hydraulic cylinder); the working mechanism 102 pressurizes the hydraulic oil entering the cylinder and transfers the hydraulic oil to the hydraulic terminal 10 composed of a plurality of hydraulic accumulators.

2) A plurality of energy transfer rods 3 suspended around the floating energy harvester 1 transfer the energy of the horizontal movement of the waves to the energy conversion lever 2, the energy conversion lever 2 transfers the obtained energy to the working mechanism 5 (eventually acting on the hydraulic cylinder), and the work machine 5 pressurizes the hydraulic oil entering the cylinder and transfers the hydraulic oil to the hydraulic terminal 10 composed of a plurality of hydraulic accumulators.

3) The floating energy harvester 1 transfers the potential energy of the tidal up and down to the lever 6, the lever 6 transfers the energy to the working mechanism 7 (eventually acting on the hydraulic cylinder), and the work machine 7 pressurizes the hydraulic oil entering the cylinder and transfers the hydraulic oil to the hydraulic terminal 10 composed of a plurality of hydraulic accumulators.

4) The hydraulic terminal 10 controls the liquid flow through a hydraulic flow valve 11 to drive a hydraulic motor 12, and the hydraulic motor 12 drives a generator 13 to generate electricity. It should be noted that when the wave power generation device provided in the embodiment of the present invention is mainly used for the offshore real estate, the thickness of the floating energy harvester should be reduced as much as possible in order to reduce the sloshing of the floating energy harvester.

The wave power generation device provided in the embodiment of the present invention can collect and utilize mechanical energy in three-dimensional directions such as up and down, back and forth, left and right and rotation of the seawater, and has the advantages of a simple and reliable structure, few intermediate links, easy installation, long service life, high energy conversion rate, high power and low cost. The energy used by the wave power generation device provided in the embodiment of the present invention is non-polluting energy, which can be used not only for power generation, but also as energy for hydrogen production, compressed gas, desalination of seawater, food, and processing of various industrial and agricultural products. The construction waste can be used as the construction material of the floating energy harvester in the embodiment of the present invention, which can solve the environmental protection problem of urban construction waste treatment. The floating energy harvester in the wave power generation device provided in the embodiment of the present invention can realize the development of real estate projects on the sea surface, provide storage, living, sightseeing, entertainment environments, and carry out marine aquaculture, crop planting, livestock and poultry breeding, food processing and other working environments.

The preferred embodiment further describes the objects, technical scheme and beneficial effects of the present invention in detail. It should be understood that the foregoing description is only intended to illustrate a specific embodiment of the invention and not to limit the invention. Any modification, equivalent replacement and improvement made to the embodiment without departing from the spirit and principles of the invention should fall within the protection scope of the invention.

The invention claimed is:

1. A wave power generation device comprising a floating energy harvester, a plurality of energy conversion levers and a plurality of energy transferring rods suspended around the floating energy harvester, wherein one end of the energy transferring rod is connected to the floating energy harvester, and the other end is sleeved onto a lower end of the energy conversion lever; the energy transferring rod transfers energy harvested from a horizontal movement of a wave by the floating energy harvester to the energy conversion lever and follows a vertical motion of the energy conversion lever as the surface of the sea rises and falls; an upper end of the energy conversion lever is connected to a first working mechanism, and the lower end of the energy conversion lever is submerged in seawater; a plurality of fixed brackets are fixed around the floating energy harvester; the energy conversion lever is hinged on the fixed bracket through a bearing and can rotate around the bearing; and a baffle is also fixed around the floating energy harvester and able to move up and down.

2. The wave power generation device of claim 1, wherein a plurality of trumpet-shaped surge energy harvesting hoods with large mouth facing down for collecting wave energy up and down are fixed in the floating energy harvester, and an upper end of the surge energy harvesting hood is connected to a second working mechanism.

3. The wave power generation device of claim 2, wherein the floating energy harvester transfers the potential energy of the ocean tidal potential difference to a third working mechanism.

4. The wave power generation device of claim 3, wherein the first working mechanism, the second working mechanism and the third working mechanism each include an energy storage mechanism or a kinetic energy machine.

5. The wave power generation device of claim 4, wherein the energy storage mechanism is a hydraulic energy storage comprising a plurality of hydraulic accumulators connected together to form a hydraulic terminal, the hydraulic terminal controls a hydraulic flow through a hydraulic flow valve to drive a hydraulic motor, and the hydraulic motor drives a generator to generate electricity.

6. The wave power generation device of claim 5, wherein the first working mechanism, the second working mechanism and the third working mechanism each drive a generator to generate electricity, or the first working mechanism, the second working mechanism and the third working mechanism are connected with each other to realize a combined drive generator to generate electricity.

7. The wave power generation device of claim 6, wherein the floating energy harvester is a hollow floater made of a material resistant to seawater corrosion; the middle part of the floating energy harvester is sagging; the floating energy harvester is provided with one or more of residential facilities, storage facilities, entertainment and leisure facilities, sports facilities and energy facilities, and a free part of the harvester can be covered for crop planting or animal breeding; a shell of the floating energy harvester submerged in seawater is composed of reefs where marine organism likes to inhabit.

8. The wave power generation device of claim 7, wherein the energy conversion lever is made of a rigid and corrosion-resistant material; the energy transfer rod is made of a rod with a specific gravity lower than that of seawater, and corrosion resistance; the surge energy harvesting hood is made of a corrosion-resistant material.

* * * * *